United States Patent
Scott et al.

(10) Patent No.: US 10,079,854 B1
(45) Date of Patent: Sep. 18, 2018

(54) CLIENT-SIDE PROTECTIVE SCRIPT TO MITIGATE SERVER LOADING

(71) Applicant: Amazon Technologies, Inc., Seattle, WA (US)

(72) Inventors: Nathan David Scott, Seattle, WA (US); Sevag Demirjian, Seattle, WA (US); Mohan Das Katragadda, Redmond, WA (US); Jui Te Tseng, Seattle, WA (US); Forrest MacKenzie Vines, Bonney Lake, WA (US)

(73) Assignee: Amazon Technologies, Inc., Seattle, WA (US)

( * ) Notice: Subject to any disclaimer, the term of this patent is extended or adjusted under 35 U.S.C. 154(b) by 229 days.

(21) Appl. No.: 14/975,494

(22) Filed: Dec. 18, 2015

(51) Int. Cl.
  *H04L 29/06* (2006.01)
  *H04L 29/08* (2006.01)
  *G06F 17/22* (2006.01)

(52) U.S. Cl.
  CPC ...... *H04L 63/1466* (2013.01); *G06F 17/2247* (2013.01); *H04L 63/0281* (2013.01); *H04L 67/02* (2013.01); *H04L 67/10* (2013.01); *H04L 67/2819* (2013.01)

(58) Field of Classification Search
  CPC . H04L 63/14; H04L 63/1441; H04L 63/1466; H04L 67/02; H04L 67/28
  See application file for complete search history.

(56) References Cited

U.S. PATENT DOCUMENTS

| 8,843,820 B1* | 9/2014 | Kay ............... G06F 21/51 715/234 |
| 9,071,576 B1* | 6/2015 | Earl ............... H04L 63/0236 |
| 9,558,060 B1* | 1/2017 | Cessac ............... G06F 11/0793 |
| 2003/0131052 A1* | 7/2003 | Allan ............... H04L 29/06 709/203 |
| 2009/0164581 A1* | 6/2009 | Bove ............... G06F 17/30873 709/205 |
| 2011/0099629 A1* | 4/2011 | Boesgaard ............... G06F 21/31 726/22 |
| 2011/0197177 A1* | 8/2011 | Mony ............... G06F 8/51 717/115 |
| 2011/0239300 A1* | 9/2011 | Klein ............... G06F 21/565 726/23 |
| 2013/0227354 A1* | 8/2013 | Shah ............... G06F 11/362 714/48 |

(Continued)

*Primary Examiner* — Khang Do
(74) *Attorney, Agent, or Firm* — Davis Wright Tremaine LLP (57) ABSTRACT

Embodiments of methods, systems and storage media associated with mitigating the effects of client-side (customer) bot-like activity caused by code injected into an e-commerce web page in the customer's browser after it is received from the e-commerce server system. Rather than entirely block a selected account or device (IP address) of a legitimate customer, a more politic process to mitigate the effects of bot-like scripts is implemented by embedding a "protective script" into a web page before it is downloaded to a client device. The protective script intercepts attempts to inject new code into the page, and it may prevent the injection entirely, or modify the injected code to mitigate its impact, for example, by slowing down its operation. This process leaves the customer free to continue normal activities on the site without any adverse impact or penalty.

20 Claims, 5 Drawing Sheets

(56) References Cited

U.S. PATENT DOCUMENTS

| | | | |
|---|---|---|---|
| 2014/0053059 A1* | 2/2014 | Weber | G06F 9/45529 |
| | | | 715/234 |
| 2014/0082478 A1* | 3/2014 | Sebastian | G06F 17/30887 |
| | | | 715/234 |
| 2014/0344670 A1* | 11/2014 | Cathey | G06F 17/30867 |
| | | | 715/234 |
| 2015/0082424 A1* | 3/2015 | Shukla | H04L 63/123 |
| | | | 726/22 |
| 2016/0028760 A1* | 1/2016 | Yang | G06F 21/55 |
| | | | 726/13 |
| 2016/0119344 A1* | 4/2016 | Freitas Fortuna dos Santos | |
| | | | H04L 63/1466 |
| | | | 726/7 |
| 2016/0182563 A1* | 6/2016 | Sambandam | H04L 63/123 |
| | | | 726/22 |

* cited by examiner

CLIENT-SIDE PROTECTIVE SCRIPT TO MITIGATE SERVER LOADING

BACKGROUND

Online customers utilize a variety of devices for online shopping and other activities, generally utilizing a web browser running on the customer's device to interact over a network with a remote server. A web browser is a software component that takes marked up content (such as HTML, XML, image files, etc.) and formatting information (such as CSS, XSL, etc.) and displays the formatted content on the screen of a device. The web browser utilizes an embedded layout engine or "web browser engine," also known as a DOM renderer or a rendering engine. Typically, a client-side web browser renders web site "pages" encoded in a markup language such as HTML and downloaded from the server during a user session. An HTML page may include executable code, for example, a script, which can be executed in the web browser to perform a variety of functions. Scripts are often embedded in HTML pages when they are downloaded from a server; and scripts can be injected into an existing page on the client side browser after the page is downloaded. Scripts are typically written in JavaScript, or in one of the derived subsets and implementations of JavaScript. The script is executed in the browser by a JavaScript engine—a virtual machine that interprets and executes JavaScript.

Scripts executed on web pages can provide various functions that are helpful to a user. Some injected scripts (those added after a page is downloaded), when executed in an online customer's (client-side) web browser, may impose undue loading on a server system such as an online shopping web site. Heavy utilization of resources on the server system may slow down its response times in connection with serving other customers' needs. On the other hand, the vendor (server side host) should be sensitive to accommodating its customers' needs. Thus there is a need to control or mitigate the potential impact of client-side scripts on a server system.

BRIEF DESCRIPTION OF DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Systems and methods in accordance with various embodiments of the present disclosure provide for mitigating the effects of computer code or scripts that, when executed in an online customer's (client-side) browser, may adversely impact a server-side system by imposing undue loading on a server system. Heavy loading on the server system may slow down its response times in connection with serving the online customer's and other customers' needs. Some scripts may be harmful to client-side systems. On the other hand, some scripts may be harmless, and even quite helpful to legitimate users, so responding to scripts should be nuanced rather than blunt force.

Some scripts are not part of a web page as it is downloaded by the server. Rather, after receiving the web page, the browser may inject code, typically a script, into the page. This is referred to as an "injected script." For example, a typical HTML document can include one or more embedded scripts, demarcated by <script> tags. The browser executes the script, which may be written, for example, in JavaScript® or another suitable interpreted programming language. A script may be injected into a page manually (by editing) or by utilizing a bookmarklet—a small software application stored as a bookmark in a web browser, which typically allows a user to interact with the currently loaded web page in some way. "Installation" of a bookmarklet may performed by creating a new bookmark, and pasting the code into the URL destination field. Alternatively, if the bookmarklet is presented as a link, under some browsers it can be dragged and dropped onto the bookmark bar. The bookmarklet can then be run by loading the bookmark normally. Bookmarklets are not necessarily harmful; to the contrary, many are quite useful. For example, a bookmarklet may provide a dictionary lookup to provide a definition for highlighted terms in the web browser window.

Some scripts exhibit behaviors similar to computer programs which are referred to as automated agents, automated robots or so-called "bots." However, in this case, the bot-like behavior is occurring in a web browser being used by a live, human customer. In general, an entity that operates a server would prefer to not entirely block access by a legitimate customer or her device. On the other hand, the effects of bot-like scripts need to be managed or mitigated so as to not adversely impact server performance.

A bookmarklet or script, when executed in the user's web browser, may unduly load the server by making a series of rapid requests, utilizing server resources to reply to each request. To mitigate these effects, in one scenario, a two-step process calls for: First, detecting that a script is being injected or has been injected into a web page previously downloaded from the server side; and then, in some cases, removing, modifying or disabling the injected script before it begins operation. Preferably, these actions are carried out in the client-side web browser itself. In another scenario, a script may not have been detected initially, but its behavior is detected to be problematic, for example, it generates requests to the server at a high frequency. In that case, a mitigation action may be taken, for example, to remove, disable or at least slow down the script.

In some embodiments mitigation may be carried out by a "protective script" that also executes in the browser. The protective script may be inserted in the web page before it is downloaded from the server. The protective script is programmed to receive an event notification when the web page is about to be changed by injection of new code. The protective script may then remove, disable or modify the new code before the browser executes it.

In some cases, the injected script may use AJAX (Asynchronous JavaScript and XML) commands to modify the web page by sending a request to import additional code without refreshing the page. In other words, a small injected script may be configured to download a more elaborate script into the page. The protective script in the page may subscribe to receive notification events, for example, event ajaxStart (Global Event) is triggered if an Ajax request is started and no other Ajax requests are currently running. Another event ajaxSend (Global Event) is also triggered before the request is run. This "warning" gives the protective script an opportunity to intervene. In another example, HTML4 provides the ability to let events trigger actions in a browser, like starting a JavaScript when a user clicks on an element. Some embodiments of a protective script might use one or more HTML4 global event triggers, such as onload or onpaste.

One mitigation technique calls for the protective script to prevent downloading of code from a suspect URL into the web page. For example, the protective script may inspect the call to inspect what URL is being accessed. In one example, any third-party site (not the server hosting the web page) is presumed to be harmful. Thus, if an injected script attempts to access a URL that is not the same as or associated with the server web site, it will be prevented.

In a further example, selected URLs may be "blacklisted" so that importing code from them into the browser is blocked. For example, some URLs may be known to source bots or scripts that perform actions that the server operator would like to prevent. Conversely, some URLs may be "whitelisted" where they are known to provide code that is not harmful or unduly burdensome from the server perspective. Either or both approaches may be used.

Another approach to detecting a pending change to the web page is to simply refresh (reload) the page in response to detecting certain events. The refresh can be requested by the protective script. The refreshed page would not have the injected code in it that attempted to modify the page. The refreshed page may again include a protective script.

Another solution involves detecting an injected script, and then modifying it to insert delay into the process; in other words, slow down its operation, so it imposes relatively less loading on the server, but can still operate. Another solution is to simply delete the injected script. In some cases, including any or all of the above, it may be desirable to post a message or warning to the user regarding the bot-like behavior of their browser. This can be done by the protective script, or the protective script may have sent a request and have the server download the warning, or reload the page with the warning in it.

Even in cases where importation of an injected script is not detected, or it is permitted (for example, the script may appear on a whitelist), a protective script may nonetheless detect behavior of another script that is potentially problematic, and take actions to mitigate its impact. Further, in some embodiments, several of the above techniques may be randomly selected to provide a more robust solution. The random selection may be done in the protective script itself. In another embodiment, different versions of a protective script may be stored on a proxy server or a protective script service, and the proxy server or service may randomly select which version to deploy. In some embodiments, the proxy server may check on backend server loading conditions, and select a protective script version based on the current conditions. A more "tolerant" version may be used, for example, when server loading is relatively light.

Figure 1:
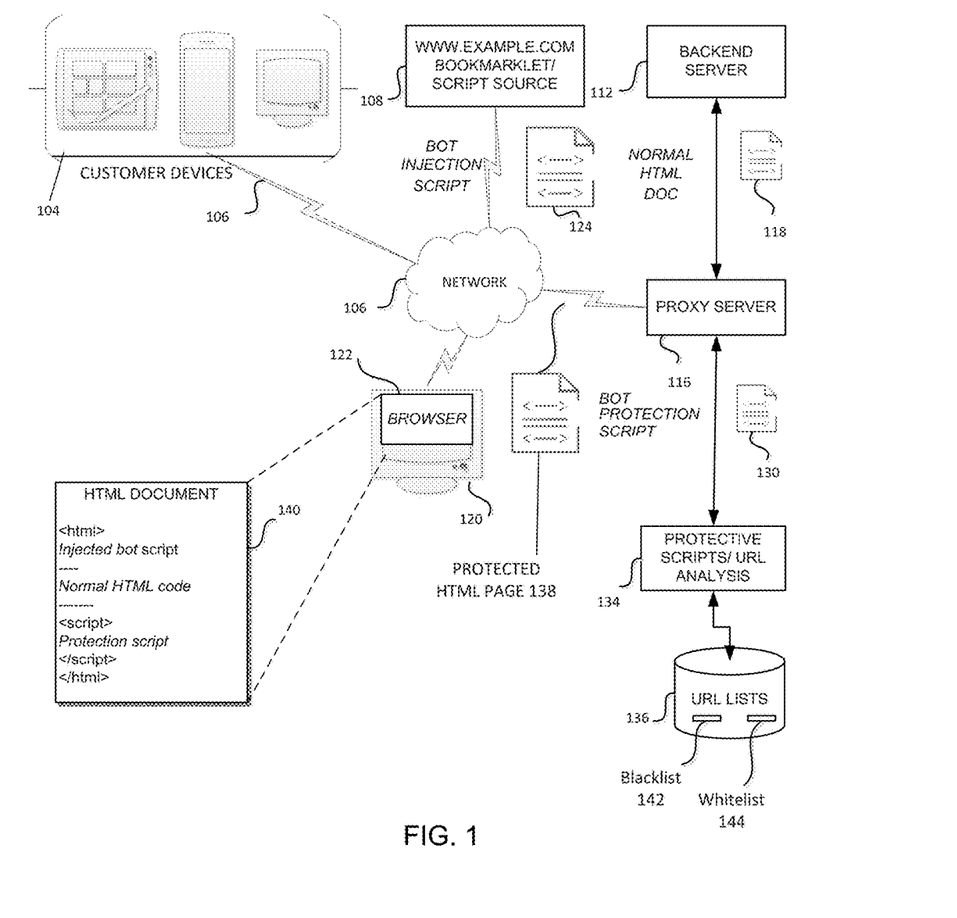
FIG. 1 is a simplified overall block diagram illustrating aspects of some embodiments consistent with the present disclosure.

FIG. 1 is a simplified overall block diagram illustrating aspects of some embodiments consistent with the present disclosure. In FIG. 1, one or more client-side devices indicated generally at 104 may be any device having at least one digital processor, such as a microprocessor, arranged to execute code and to access a network. A device may be, for example, a tablet computer, a smartphone, a personal computer, a cell phone, handheld messaging device, smartwatch, laptop computer, set-top box, kiosk, personal data assistant, electronic book reader, and the like.

A device includes, or may be coupled to, an adapter for connection to a network. Network connections may be wired or wireless, and include, for example, a wireless telecom data connection, WiFi, Ethernet, NFC, Bluetooth®, etc. The device is assumed to have access to a network, such as the Internet, for present purposes. The device is assumed to have functionality for processing a markup language, such as HTML, to render a web page or similar document. One example of such functionality may be a web browser. Several web browsers are commercially available; and further details of their operation are well known.

Referring again to FIG. 1, a web server implementing a web site is indicated at 108. In this example the web site has a URL "www.example.com." Further details of the World Wide Web, including websites and web servers, are well known. The web server 108 is coupled to a network 106 such as the Internet for communications other devices, such as devices 104 and PC 120 further discussed below.

Another web server, labeled backend server 112, also implements one or more web sites. The backend server 112 is a simplified representation; it may be implemented with multiple servers, for example, interconnected over a LAN or WAN, forming a server system or a network of servers. Each server may have a different function; for example, some servers may run applications or deliver a service. The server system may include or be coupled to various memory systems and/or databases, which again may be distributed. For example, the server system may implement one or more online e-commerce or shopping websites. Data storage (not shown) may support the server system with databases of product inventories, customer data, vendor data, shipper data, etc. An example backend server environment is described in more detail later with reference to FIG. 5.

A proxy server 116 is coupled to the backend server 112, for example, over a LAN, and also is coupled to the network 106. In general, a proxy server is any computer system offering a service that acts as an intermediary between the two communicating parties, the client and the server. In the presence of a proxy server, there is no direct communication between the client, say browser 122, and the server, say backend server 112. Instead, the client connects to the proxy server and sends requests for resources such as a document, web page or a file that resides on a remote server. The proxy server handles this request by fetching the required resources from the remote server and forwarding the same to the client. In FIG. 1, the proxy server 116 is configured to provide service to the network 106 to allow remote clients to make indirect network connections to other network services, such as a website provided by the backend server 112 in this example. Here "client" refers to an application, for example, a web browser, that may be running on a remote user device 104 or 120 coupled to the network 106.

In a typical operation, a user may utilize a client program on a device 104 to access a website hosted by the backend server 112, via the proxy server 116, for example to shop on an e-commerce web site. The user's client, for example, a web browser 122 running on a PC 120, may send requests to the server system over the network 106. The server system via the proxy server 116 returns a reply, which may comprise any resource, for example, a markup language document or "web page," described in more detail later. The reply may include an HTML, document 118 provided by the backend server 112, which after receipt will be rendered by the web browser 122. A web page of an e-commerce site, for example, may contain listings of products for sale, descriptions, photographs, reviews, etc. Typically, the page includes links to other pages, enabling a user to browse, place orders, update their account information, etc.

Another website 108 may provide code or "scripts" for a user to download for use in the user's web browser. One type of script is referred to as a bot injection script 124. This script is designed to be injected into a web page, such as an HTML page. If it is inserted, in general, the browser will execute the script when it renders the page. JavaScript is an example of code that can be inserted and executed in an HTML document, typically identified by the <script> tag. The website 108 may download a script 124 in a requested web page to the client browser 122. The script 124 may be copied and pasted from the downloaded page, or it may be provided in a separate file. In some cases, the script may itself have a call or request to fetch another script from the same or a different source (generally a website). The bot injection script may be included in a bookmarklet, so that is can be conveniently stored and managed as a bookmark in a web browser.

Scripts are executable by a web browser, generally when they are inserted in a markup language type of document, such as an HTML web page. We refer herein to a "web page" in the broad sense of any markup language type of document or file. There are many known markup languages; some of the types of markup languages include XML markup languages, general purpose markup languages, document markup languages, user interface markup languages, etc. Some of the well-known document markup languages include HTML, MathML, SVG, TeX, LaTeX, Wiki markup, XHTML, and XHTML Mobile Profile. After a user navigates to a selected web site, and the web site host serves a web page to the browser, a user may then edit the web page code by inserting a script. This may be done manually (copy and paste) using almost any editor, or automatically by clicking a bookmarklet designed for this purpose. In some cases, the bookmarklet may include the script, or it may call an external source and download a script, or a combination of both methods. Other ways of inserting scripts or other processes or routines for execution by a web browser or similar program are known and still others are evolving. This disclosure is not intended to be limited to technologies, programming languages, or software implementations known at the filing date of this application. Later developed technologies that accomplish essentially the same functionality in similar ways should be considered equivalents to the present disclosure.

A wide variety of scripts are publically available, to provide various functions, many of which are helpful to a user of a web browser. Many of them are harmless, but others may present security risks to the client. For example, some scripts may attempt to collect confidential information such as contacts or passwords stored in a device, and export them without permission from a user. These security risks may be mitigated for a user device by the protective scripts disclosed herein. In some cases, the scripts, when executed in a browser, especially by a large number of clients, may impose excessive loading on a server system, such as the server system 112, 116 described above. For example, a script may collect or "scrape" a large volume of data from a server system. This generally entails a large number of requests and replies, which may be executed rapidly, in the aggregate utilizing significant server system resources.

In another example, a web site may implement a special offer that commences at a specific start time, say providing an opportunity for a customer to purchase an item that is in short supply, or to purchase an item at a particularly attractive price. In some cases, it is advantageous for a customer to place her order as quickly as possible after the item becomes available for purchase on the web site. She may be competing with many, perhaps thousands, of other customers around the world. To help a user get to or near the "front of the line," a user may create or obtain a script that will "watch" for the appearance of the purchase opportunity, for example, a "click to buy" button on the subject web page. Such scripts are available for download over the Internet. In one scenario, a user navigates to the page where the special offer appears before the special start time. The offer page is rendered in the client-side browser. The user may then inject the script into the page code, for example, by clicking a bookmarklet designed for that purpose. The browser then executes the injected script. In this description, the term "injected script" may refer to a script, or more generally any code that is injected into a web page document after it is served or downloaded from a server system. Put another way, the injected script is not part of the "normal" page provided by the host server system.

In operation, an injected script may keep refreshing the page, rapidly, until the purchase button appears, and then "click" it programmatically by sending an appropriate request message to the server system. An asynchronous request (for example, using AJAX) may be suitable for such a task. In this way, the script gives the user a speed advantage over many other users. As mentioned, a large number of scripts that are each refreshing a page at high speed can impose loading on a host server system that can degrade response times for other customers.

To mitigate the effects of client-side (customer) bot-like activity caused by scripts injected into a web page, in some embodiments, a process detects attempts to inject new code into the page, and takes appropriate action (or "countermeasures") in response, which may be, for example, to prevent the code injection entirely, or modify the injected code to mitigate its impact, or reload the page, as described in more detail later. In some embodiments, detection and countermeasures may be implemented by a "protective script" which, like the injected script, comprises code executable in a web browser or similar client. Referring again to FIG. 1, a "protective script" 130 may be provided by the proxy server 116, or provided to the proxy server by a protective script service or server 134. The proxy server 116 may embed the protective script 130 into a normal web page document 118 provided by the backend server 112. In other embodiments, the backend server 112 may embed the protective script. In any case, the resulting modified document, which may be a protected page 138, is provided via the network 106 to the client side browser 122, in lieu of the normal document 118. For example, an HTML document 140 is illustrated in simplified form as including an injected (bot) script, normal HTML code, and the protection script. Code that includes a script technically is still "normal" HTML, in the sense that it complies with applicable standards. Normal web page document is used herein to mean an unmodified web page document as typically returned by a host server system such as the backend server 112.

In some embodiments, a protective script process or service 134 may provide a protective script. It may also work to track and analyze resources, for example, web sites, where injected scripts are sourced. The service 134 may maintain (create internally or import), or it may have access to, a datastore 136 that includes a "blacklist" 142 of resource identifiers, for example, URLs, that identify resources where harmful or otherwise undesirable scripts are sourced. A script or a script source such as a website may be deemed undesirable for a variety of reasons. In one example, a script imposes a relatively high level of loading on a host proxy server or backend server system when executing in a browser or the like. Excessive loading may result from an excessive frequency of requests as compared to a certain threshold. The source of requests, type of data associated with requests, device type making the requests, user accounts associated with requests, and location of requesting devices are all examples of criteria that may be taken into account by an operator of the host site (proxy server/backend server) in determining what scripts or script sources it deems undesirable and therefore includes on the blacklist 142. These examples are merely illustrative and not intended to be limiting.

Preferably, the blacklist 142 is updated periodically. It may be updated based on experience, such as recent request activities. It may be updated based on reports received from "protective scripts" as further described below. In one example, a protective script may determine that an injected script from a certain URL is generating excessive requests to the server-side. The protective script may report the URL to be added to the blacklist. Further, the datastore 136 may include a "whitelist" 144 of resource identifiers, for example, URLs, that identify resources where relatively "safe" or well-behaved scripts are sourced. Preferably, the whitelist 144 and or the blacklist 142 should be updated dynamically to keep them current as new information becomes available.

Figure 2:
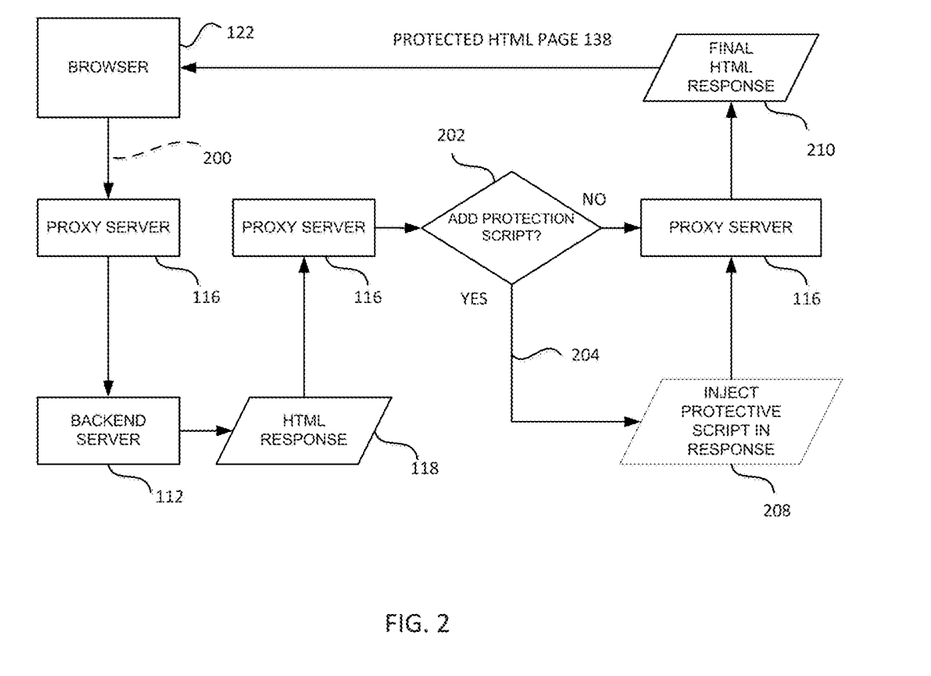
FIG. 2 is a simplified flow diagram illustrating an example process for mitigating potential impact of injected scripts on a client-server system in accordance with various embodiments.

FIG. 2 is a simplified flow diagram illustrating an example process for mitigating potential impact of injected scripts on a client-server system in accordance with various embodiments. This process may be implemented using the proxy server 116 and the backend server system 112 described above. In some embodiments, the process may also involve the protective script service 134 and datastore 136. Other arrangements are described later with regard to FIG. 5. In the present example, a web browser 122 executing on a client-side device, such as customer device 104 or customer device 120 described above, sends a request, such as an HTTP request 200, to a proxy server 116 to obtain network content, such as a web page document. The request may be generated in response to a user manipulation of an input device associated with a client-computing device to request a page. The user input may comprise typing, gestures, voice, pointing device "clicking," "swiping" on a touchscreen or any other action intended to convey a user's intent or request to the device. For example, a user may enter www.example.com or another URL into a browser, or select www.example.com in a list of search result pages. In another example, a search application may navigate directly to a website responsive to a user-input search query without further user input.

In response to receiving the request from browser 122, the proxy server (or a proxy service—see the description of FIG. 5 below) determines if and to which backend service(s) additional calls should be made. The proxy server 116 communicates with a backend server or server system 112, and the backend server provides an initial response, such as an HTML document 118, to the proxy server. The proxy server and the backend server may be "virtual" servers, in which case 116 and 112 could actually be processes running on common hardware resources but operate on different/isolated instances. There may be other back-end services, besides serving HTML or other documents, implemented in a typical environment. In general, various proxy services may be provided by one or more servers; in other words, on the same or different physical hardware. Similarly, various backend services may be implemented on one or more servers; again, on the same or different physical hardware.

The proxy server 116 may determine whether or not to add a protective script to the document, decision 202. In a preferred embodiment, this decision may be part of the proxy service's decision logic. The decision may be made before or after the proxy server 116 communicates with the backend server 112. In some embodiments, this decision may be omitted and protective scripts added to all network pages ("web pages") by default, proceeding via path 204. The decision 202 may be made based on one or more of various criteria. These criteria may be selected, supplemented, and optionally weighted, based on experience. Some criteria may be related to the current user session. In general, a "session" comprises an interactive information interchange, also known as a dialogue, a conversation or a meeting, between two or more communicating devices. A session is set up or established at a certain point in time, and then torn down at some later point. In one example, a session may begin with a login and end with a logout. Examples of criteria related to a current user session may include the user ID, client device ID (for example, MAC address or IP address), or characteristics of the customer/account (high dollar volume, last order placed, order history, etc.).

Other criteria may focus on the server side. For example, these may include a metric responsive to a frequency of requests received from the browser during the current session. The sizes of pages requested (and thus the volume of data in the corresponding replies) may be considered. Another criterion may be current server-side loading conditions. For example, when the servers are heavily loaded, protective scripts may be added to all pages. Other conditions may include, for example, that a special limited offer or "flash sale" is beginning soon that is expected to attract heavy request traffic. Some web pages may be manually selected as relatively "high risk" pages. These pages may include, for example, shopping cart pages, checkout pages, etc. For high-risk pages, protective scripts may be included by default.

There is the possibility that the current session is being conducted by a bot masquerading as a human customer. An increase has occurred in the number of requests to network services that are initiated by automated systems and certain computer programs, which are referred to as automated agents, automated robots or so-called "bots," provide tools that automate tasks, such as crawling through webpages to scan and gather keywords, text and links. Web Bots may exhibit sophisticated functionality and place widely varying demands upon Web servers to which the HTTP requests are directed. If a bot is detected, or suspected, a decision may be made at 202 to add a protective script to pages before download. Bot detection systems typically identify a HTTP request from Bots based on the IP (Internet Protocol) address associate with the source of the HTTP request. Such addresses may be added to the blacklist 142 mentioned above, but this technique is not always robust or reliable in distinguishing human from bot activity. Methods may be implemented that analyze request traffic to assess the likelihood that it is human activity, and other metrics analyze the likelihood that the traffic is bot driven. These two kinds of assessments can be combined to determine an overall confidence as to whether the traffic is human or bot-driven. In a case that the confidence level that the traffic is bot-driven exceeds a predetermined threshold, for example, the decision may be made at 202 to add the protective script.

In other cases, for example, when the host server system is nearing start time for a special sale, as discussed above, addition of protective scripts may be indicated. The proxy server may take into account recent experience in terms of requests it receives. For example, if the proxy server receives many requests (within a relatively short time) for a certain page, that may be an indication that client devices are utilizing bot-like scripts on that page. The number of requests and applicable time period may be defined by certain threshold values. Thus, the proxy server may begin to add a protective script to that page in subsequent responses. If the decision to add a protective script is negative, flow continues and the proxy server 116 provides the normal (unaltered) HTML response 118 as the final response 210.

If the decision to add a protective script is positive (YES), flow continues via path 204 to a process 208 to inject a protective script into the response 118. In an embodiment, the protective script may be inserted by the proxy server into the page 118 provided by the backend server 112, thereby forming a modified or "Final HTML Response" 210. For example, the proxy server logic may edit the HTML response 118 to add the protective script using the HTML <script> tag. The modified response, for example, a protected HTML page 138, is sent by the proxy server over a network such as 106 to the browser 122.

Figure 5:
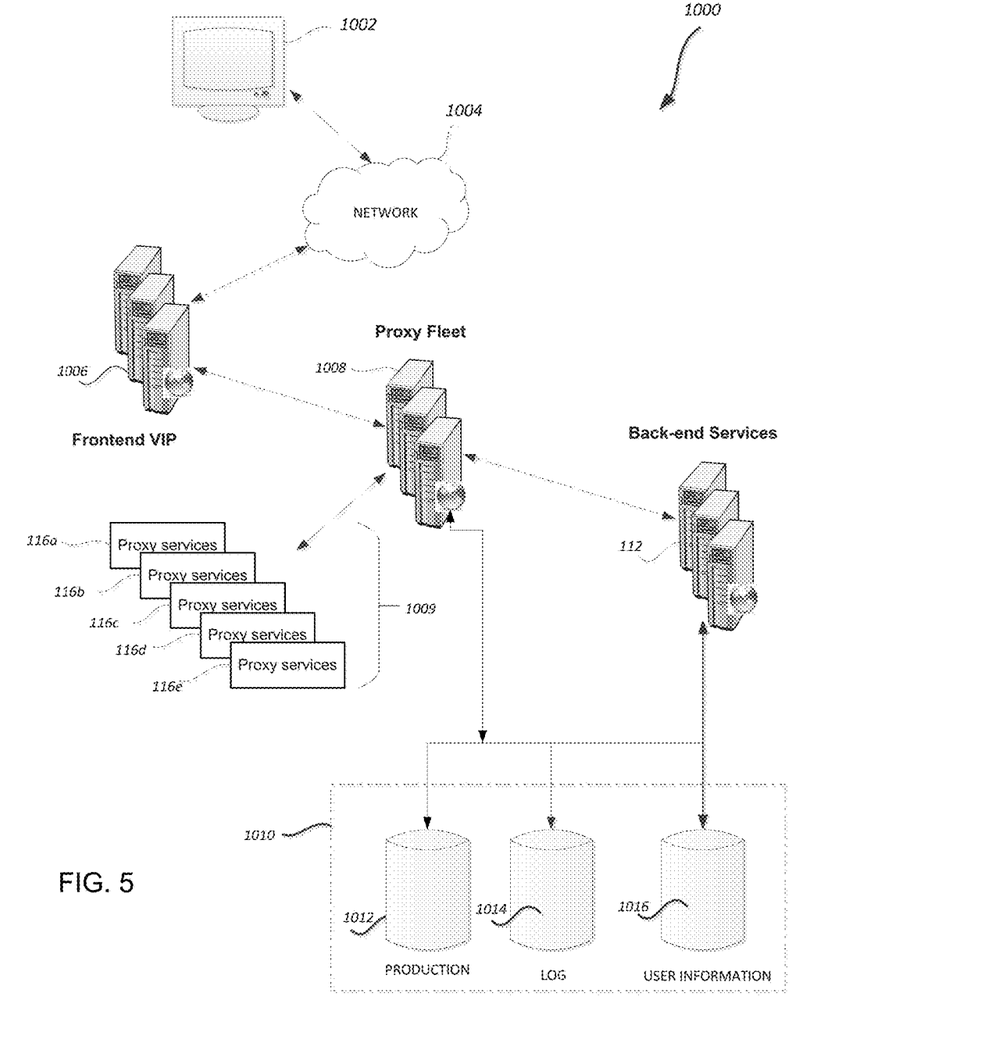
FIG. 5 illustrates an environment in which various embodiments can be implemented.

The block diagram of FIG. 1 and the flow diagram of FIG. 2 present a simplified view of a proxy server 116 and a backend server 112. A more complete presentation of a suitable environment is shown in FIG. 5, described below. Although FIG. 5 is not intended to be a complete technical document, it conveys in greater detail the use of multiple servers forming a "proxy fleet" that provides the functions of proxy server 116 and many other services. Similarly, various backend server services, including the functionality of backend server 112 in FIG. 1 may be provided by one or more servers as illustrated in FIG. 5.

Figure 3:
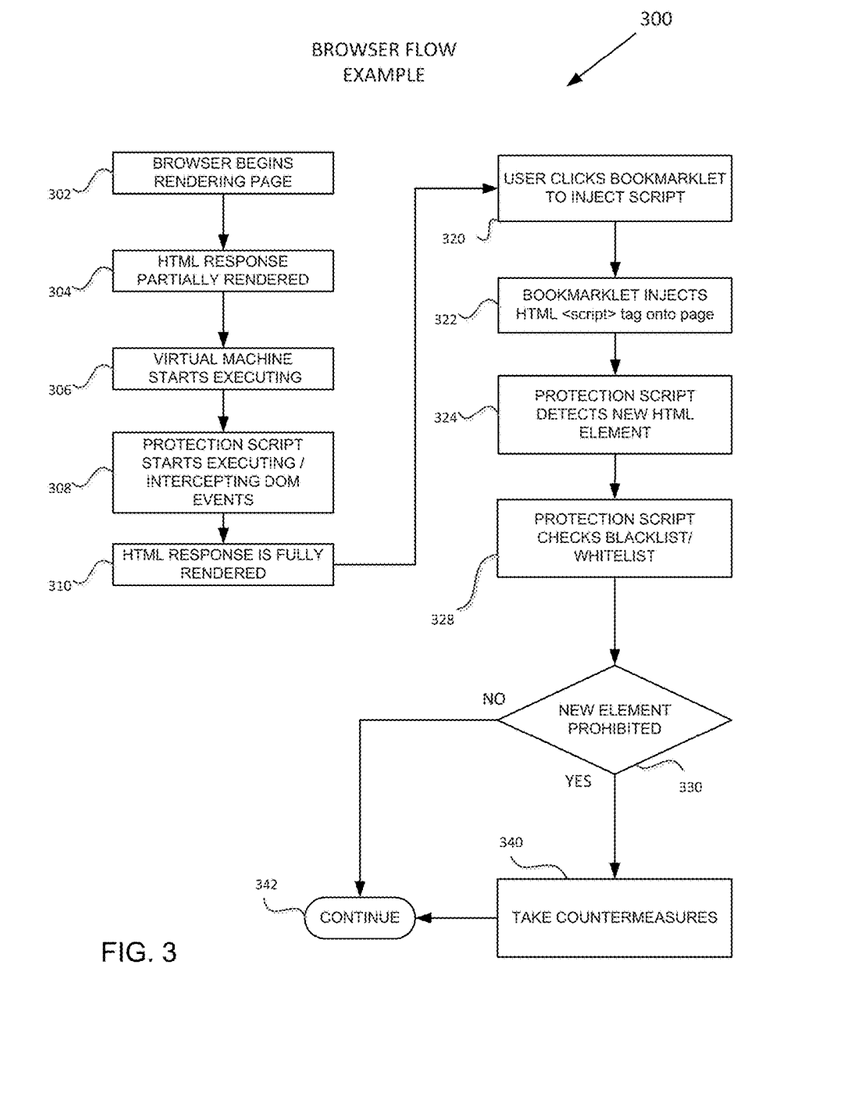
FIG. 3 is a simplified flow diagram illustrating operations in a web browser on a client-side computing system in accordance with some embodiments.

FIG. 3 is a simplified flow diagram illustrating operations 300 in a web browser on a client-side computing system in accordance with some embodiments. In this example, the browser begins to render or lay out a received web page document, for example, an HTML document, block 302. As the HTML document is partially rendered, block 304, a virtual machine starts executing the protective script, block 306. This process is described in more detail below with reference to a pseudo-code example. One example of such a virtual machine is a JavaScript engine. In other words, the virtual machine begins to execute the protective script without waiting for the page to finish rendering. A JavaScript engine is a virtual machine which interprets and executes JavaScript; various versions are available. FIG. 1 illustrates an HTML document 140 that includes a JavaScript protective script in the page; the script is demarcated by start and end <script> tags.

Returning to FIG. 3, the engine starts executing the protection script, which in turn begins "watching" to intercept DOM events, block 308. Specifically, a pending change to the DOM or structure of the HTML elements will spawn a DOM "event" that the protective script is configured to recognize. In some embodiments, an event exposed by a rendering engine or by a JavaScript engine may be used to detect introduction of a new HTML element on the network page. Next, the page is fully rendered, block 310, meaning that all of the elements of the HTML page have been "executed" to form correspond elements of a display on a screen.

As mentioned above, a script can be inserted by a user into a downloaded network page, for example, an HTML page, with a simple editor. A user may write the script, or download it from a network resource. It can be copied and pasted into the downloaded network page. In other scenarios, a user may obtain a bookmarklet from a network resource, for example over the Internet. A bookmarklet is a small software application stored as a bookmark in a web browser, which typically allows a user to interact with the currently loaded web page in some way. "Installation" of a bookmarklet is performed by creating a new bookmark, and pasting the code into the URL destination field. Alternatively, if the bookmarklet is presented as a link, under some browsers it can be dragged and dropped onto the bookmark bar. The bookmarklet can then be run by loading the bookmark normally. In some cases, the bookmarklet may itself include a script designed for a particular purpose, or it may call an external source and download a script when it is executed by the browser, or a combination of both methods.

Figure 4A:
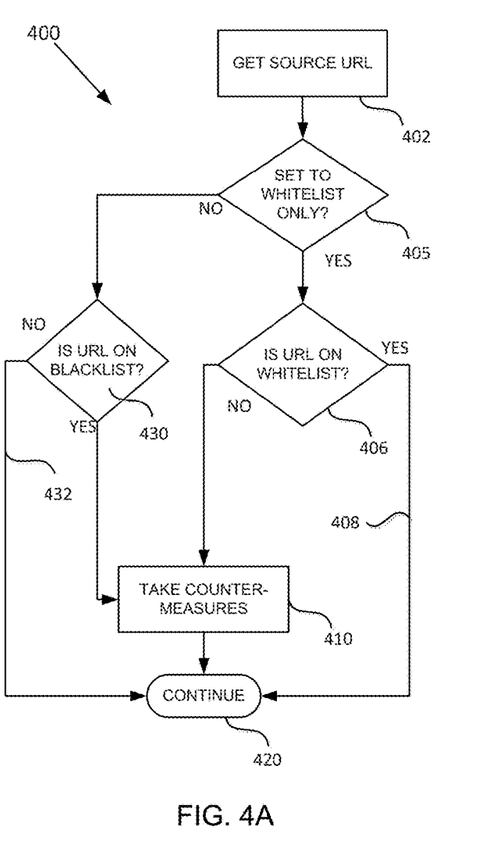
FIG. 4A is a simplified flow diagram illustrating one example of a process for checking a source URL against a whitelist of approved sites and/or a blacklist of suspicious sites.
Figure 4B:
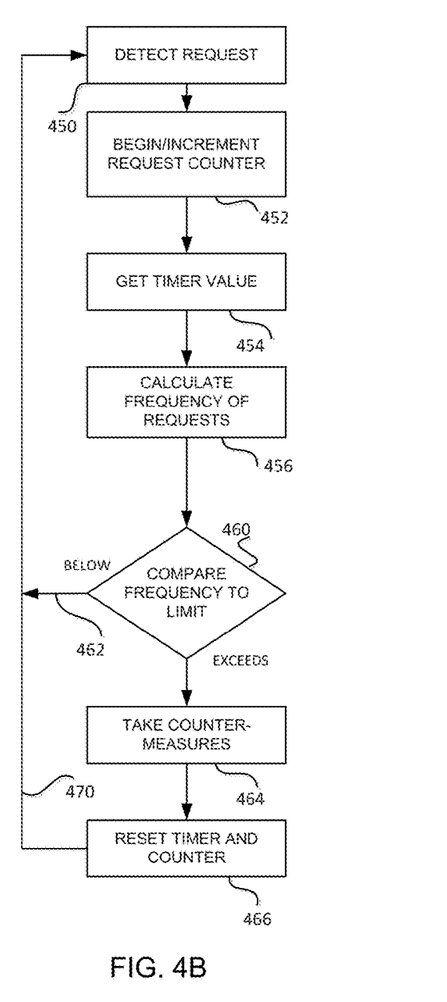
FIG. 4B is a simplified flow diagram illustrating one example of a monitoring process executing in a protective script in accordance with some embodiments.

Continuing the present example illustrated in the flow diagram of FIG. 3, we assume a bookmarklet has been previously installed on the browser, for the purpose of injecting a script into the current page. A user may "click" the bookmarklet, block 320, using a pointing device or other input to the client-side device on which the browser is running, or otherwise activate the bookmarklet of interest. The bookmarklet injects an HTML <script> tag onto the page, block 322; in other words, it injects an executable script. In other scenarios, injection of the script may be automated. In some cases, a plugin may inject the script without user input. Next, block 324, the protection script detects the new HTML element, as more fully described below with reference to a pseudo-code example. In one scenario, a protection script identifies the source of the injected script and compares it to approved (whitelist) and/or prohibited (blacklist) lists of source identifiers, block 328. For example, the source identifiers may be URLs. Creation and maintenance of the blacklist and whitelist are described below with reference to FIG. 4.

The process 300 of FIG. 3 is limited to illustrating the use of a blacklist and a whitelist in determining whether to take countermeasures responsive to a new script. Various other criteria may be used, as discussed above with reference to the decision (202) as to whether to add a protective script to a page.

In some embodiments, either one or both of these lists may be embedded in the protective script, as illustrated below. In some other embodiments, they may be external. For example, the protective script may determine an identifier of the injected script, and then send that identifier in a request to a server, for example, the proxy server 116 in FIG. 1, or to another trusted source, for the proxy server or trusted source to check it against applicable black/white lists, and return a result indicating to the protective script whether or what countermeasures to take. A trusted source may be one certified by a certificate authority, for example, under state law.

If the result of the comparison(s) is that the new HTML element should be prohibited, see decision 330, the protective script may take one or more countermeasures, block 340. If the new element is not prohibited, the script is completed, continue block 342. Countermeasures may include, for example, deleting the new script from the page, modifying the new script to slow its operation, preventing the script from executing, and optionally, in addition to any of the foregoing, presenting a warning message on a display panel. In some cases, prohibiting the new element may improve security for the device by blocking or disabling a script from an untrusted source which could present a security risk.

In the case of a decision to take countermeasures, block 340, a decision may be made (not shown) to select among more than one available countermeasure or protective action. There may be a default countermeasure, for example, deleting the new script from the page. This may be done by the protective script executing a delete command or function as illustrated in the pseudo-code below. Another countermeasure may be to slow down the new script. This can be done by editing the new script to interject delay into its operation. Preferably, this too can be done by the protective script executing in the browser.

Another method for selecting a countermeasure, or deciding to take no countermeasure, may involve analysis of the new script. In some cases, a source location of a script may change, or the source may be "faked," for example, after the source location has been listed on a blacklist. In that scenario, the blacklist will not catch it. But analysis of the content of the script may be used to identify it. One way to do this may be to create a hash function of the new script and compare the result to a list of various hashes, which could be characterized with respective countermeasures.

Another method for selecting a countermeasure may be based on conditions on the server side at the time the injected script is detected. The proxy server may maintain metrics of current conditions, such as loading on the back-end server, or response times to customer requests. A proxy service may push an update out to the protective script when appropriate. In another embodiment, the protective script may query the proxy server for an update on server-side conditions, and use the correspond reply to select countermeasures. These communications may be done asynchronously, i.e., without reloading the page. In some embodiments, the proxy server or a proxy service may update one or more protective scripts, in response to current server-side conditions, before the scripts are put into use. This enables the scripts to run autonomously in the client-side browser.

Below is sample pseudo-code listing of an example of a protective script for mitigating potential impact of injected scripts in accordance with some embodiments:

```
document
is a variable available on every page. It represents the DOM for the
current window.
<HTML>
...
<script>
  variable
WHITELISTED DOMAINS = ["<contentserver1>.<tld>,
"<contentserver2>.<tld>"];
  variable BLACKLISTED DOMAINS = ["<contentserver3>.<tld>"];
  variable WHITELIST_ONLY = true
  define function scriptChecker( htmlElement )
    if htmlElement is a <script>
      variable
srcDomain = htmlElement.src.getDomain( ) // get the "src" (source)
attribute from htmlElement, which is where the script loads from,
then parse out the domain name
```

```
        if WHITELIST_ONLY and WHITELISTED_DOMAINS does
not contain srcDomain
          takeAction( htmlElement )
        else if not WHITELIST_ONLY and
BLACKLISTED_DOMAINS contains the srcDomain
          takeAction( htmlElement )
        end
      end
    end
  define function takeAction ( htmlElement )
    // removes the element from the page
    document.delete( htmlElement )
  end
  define function registerHook( )
    //gets the "HTML" DOM element, which is the top-most
element. Could also be '*', which is everything on the page
    variable htmlElement = document.getElement ( 'HTML');
    // make sure we trigger the event even when
    variable
config = { triggerWhenChildrenChange: true };
    variable observer = new Observer(scriptChecker);
    observer.observe(htmlElement, config);
  end
  document.onLoad(registerHook( ));
</script>
...
</HTML>
```

Actual executable code, written in JavaScript or another suitable interpreted language, and configured generally in accordance with the above pseudo code, may be executed by any suitable web browser such as browser 122 executing on a client-side device such as 104 or 120. JavaScript is one language that is compatible with HTML for execution by a browser when it renders a page in which a Javascript program or script is included. A protective script generally in accordance with the above pseudo code may be imported, stored, maintained, edited or created using an editor application in the context of various embodiments of the system described with reference to FIG. 1, or using one or more of the components of the systems described with reference to FIG. 1 and FIG. 5. For example, referring now to FIG. 1, a protective script may be imported via the network 106 to the proxy server 116. The script may be stored, maintained, edited or created using the proxy server 116, or by the protective script service 134, in conjunction with the data-store 136. In some embodiments, referring now to FIG. 5, a protective script may be imported via network 1004 and frontend VIP 1006 to the proxy fleet 1008. The script may be stored in the datastore 1010. A script may be stored, maintained, edited or created by one or more of the proxy services 1009. One of the proxy services may provide for selection of a protective script as further explained below.

Immediately upon loading the document, in other words before some other script, such as an injected script, begins execution, the above code begins execution with the function registerHook ( ) which gets the HTML DOM element, setting the variable htmlElement. An observer in the function detects an event when a new element is found (the DOM changes). The function scriptChecker (htmlElement) determines whether the new element is a script (for example, by looking for the <script> tags). If it is a script, it extracts the source identifier, from the "src" (source) attribute of htmlElement, setting the variable srcDomain to that value. A Boolean variable (or flag) WHITELIST_ONLY sets a condition requiring (if true) that the script source must be on the whitelist to be permitted. The whitelist in this example is contained in the variable WHITELISTED_DOMAINS, and it includes, for illustration, "<contentserver1>.<tld>" and "<contentserver2>.<tld>." For illustration, the variable BLACKLISTED_DOMAINS includes an example "<contentserver3>.<tld>."

Continuing with reference to the example pseudocode, if WHITELIST_ONLY is true and WHITELISTED_DOMAINS does not contain srcDomain, then takeAction executes on the element to remove it (using document.delete (htmlElement) from the page. If a flag WHITELIST_ONLY is false and BLACKLISTED_DOMAINS contains the srcDomain, then once again takeAction executes on the element to remove it from the page. To recap, in this example, if whitelisting is required, and the source of the script is not on the whitelist, the protective script removes it from the page. If whitelisting is not required, and the source is on the blacklist, it is likewise removed. In some embodiments, a whitelist alone may be used, with the requirement that the source be on that list to avoid deletion. In some embodiments, a blacklist alone may be used, with new scripts removed only in the case that they are on the black list.

In some embodiments, a protective script may be configured to take zero or more protective actions or "countermeasures" other than deleting a new script. Some examples of countermeasures may include the following:

1. A new script may be permitted to load and execute, for example if it appears on a whitelist.

2. A new script (loaded and executing) may be monitored by the protective script, for example, by counting requests that it generates. In the event that request frequency exceeds a threshold, additional countermeasures may be taken, or a report sent to the proxy server. The proxy server may adjust that frequency threshold, either before utilizing the protective script in a page, or by sending an update to the protective script executing in the browser.

3. A new script may be slowed down but still permitted to run. It may be slowed down by inserting delay each time it makes a request. The request may be detected by an event notification. The amount of delay optionally may be scaled, linearly or in any other fashion, responsive to the volume of request traffic. The amount of delay may be adjusted responsive to input from the proxy server. The proxy server may provide that input responsive to conditions on the server side.

4. Delay may be inserted by inserting a parameter or adding information to the request to the proxy server to direct the requests to a tar pit server configured to slow down responses.

5. Delay may be inserted, effectively, by inserting errors or dropping requests. These actions may be taken on the server side, and they may be responsive to feedback from the protective script. Again, the amount of delay may be adjusted dynamically responsive to server-side conditions.

6. In the event that a running script attempts to inject another script, that attempt will be detected, by a DOM event or by a document.createElement call, as discussed above, and that new attempt will be processed as described earlier. Countermeasures may be taken as determined to be appropriate to the new call.

7. Other countermeasures may be taken to ease loading on the server side. For example, responsive to an indication from a protective script, or responsive to server-side conditions, or a combination of the two, the server may switch to serving lighter (smaller) pages corresponding to the requested page. The server may deliver cached pages, or an API.

8. Methods for slowing down an injected script may be varied utilizing a plurality of different methods such as those mentioned above. The selection of slowdown methods, or other countermeasures, may be varied pseudo-randomly. This feature may help to defeat an injected script that is programmed to work around any specific countermeasure it identifies.

In some embodiments, a protective script may be configured to notify a user, for example, by displaying a message panel on the browser, regarding the injected script, for example, with a warning, or explanation of what the protective script has done. It may read, for example: "A SCRIPT FROM SRC <contentserver3>.<tld> HAS BEEN BLOCKED" [or REMOVED or SLOWED DOWN, etc.]

A protective script may gather information or data as it operates, and send that information back to the proxy server or to another location external to the client device. Such data may comprise what actions the script has taken on the device, or report errors or problems. The protective script may report URLs that are frequently referenced by injected scripts. Asynchronous methods such as AJAX may be used to send messages to the proxy server without reloading the current page. The proxy server, in turn, may provide the received data to the service 134 for use in managing the blacklist 142 and whitelist 144. Conversely, the proxy server may update a list embedded in the protective script, such as the blacklist, dynamically. It may update a protective script, for example, when the blacklist 142 or whitelist 144 is updated, as indicated to the proxy server by the service 134.

FIG. 4A is a simplified flow diagram illustrating one example of a process 400 for determining whether or not to take countermeasures or protective actions responsive to a new script, based on a blacklist and a whitelist or source identifiers such as a URL. In an embodiment, this process may be carried out by the browser, executing the protective script. In one example, the process begins by ascertaining a source location of the script, which may be a URL, block 402. The process logic may be set to a "whitelist only" mode, for example by a flag or variable in the protective script. A "whitelist only" flag may be set (or cleared) by the proxy server in connection with inserting the protective script into a requested page. The proxy server logic may consider various factors in determining whether or not to switch the protective script to whitelist only mode. For example, the proxy server may take into account recent loading levels (or response times) on the backend server system, and switch to whitelist only mode when loading is relatively heavy (or response times longer than a given threshold).

If the whitelist only flag is set, the decision 405 resolves to YES, and the process continues to decision 406 to determine whether or not the source location is on a whitelist. In an embodiment, the whitelist may be embedded in the protective script. In other embodiments, it may be loaded externally from the proxy server or another source. If the source location of the new or injected script is not on the whitelist (NO), the process proceeds to take countermeasures, block 410, and then it continues or terminates at 420. If the source location is on the whitelist (YES branch from 406), countermeasures are not taken, and the process flows directly via path 408 to the terminus 420.

Alternatively, in the case that whitelist only mode is not set (NO from decision 405), the process continues at decision 430 to determine whether the source URL is on a blacklist. If not, the process continues via path 432 to the continue block 420 without taking countermeasures. If the source is on the blacklist (YES at 430), the process continues to take countermeasures at 410, and then terminate as noted. The term "protective action(s)" is used herein interchangeably with countermeasure(s).

The sequence shown in the FIG. 4A is merely illustrative. For example, in another embodiment, the blacklist may be consulted (decision 430) immediately after acquiring the location or URL of the new script (block 402). If the URL is not on the blacklist, the logic may go to decision 405 to determine the whitelist only setting. If the URL is on the blacklist, countermeasures may be taken (410) without consulting the whitelist only flag or the whitelist. In a different embodiment, there may be no whitelist mode, and the blacklist is used by default. Various countermeasures or protective actions are described above.

Preferably, as noted, the process of FIG. 4A may be carried out in a browser by executing a protective script such as described above. In another embodiment, this process may be carried out in the proxy server, or by another server or service such as 134. For example, the protective script may be configured to acquire the new script source location (block 402) and then send that information to the server. The server may then execute logic comparing the source location to a blacklist and/or to a whitelist, similar to the process 400 described above. The proxy server may then return a simple yes/no result, indicating to the protective script whether or not to execute countermeasures. In another example, the proxy server may return a message indicating specifically what countermeasure(s) to take. In some environments, these operations may be implemented by one or more proxy services, further described below with reference to FIG. 5.

In some embodiments, the blacklist (142 in FIG. 1) may be created and maintained by a proxy service, for example, proxy service 116d in FIG. 5. The proxy service may store the blacklist in a datastore (136 or 1010 in FIG. 5). The proxy service may add to the blacklist source identifiers corresponding to sites identified by a protective script as sourcing injected scripts that are potentially harmful or demanding in terms of the requests they generate to the server. For example, a frequency of requests to the server side may be monitored by a process of the type described below with regard to FIG. 4B. The proxy service may add to the blacklist source identifiers that it determines are potentially harmful or demanding in terms of the requests they generate to the server. To that end, for example, a protective script may be configured to extract the code of an injected script, and send injected code to a proxy service for analysis. Various analyses may be conducted on the injected code. As one example, certain kinds of JavaScript statements may be indicative of a potentially harmful script. Often scripts are called either in a loop or with a timeout. A proxy service may extract the timeout from the injected script code itself. For example, an analysis program may recognize a statement "setInterval(makeRequestFunction, 1000)," which would call the function "makeRequestFunction" once every second (1000 milliseconds). If a frequency of one request per second were to exceed a predetermined limit, that result may be used to make a determination to add a source identifier of the analyzed script to a blacklist. A blacklist may also include source identifiers provided by a third party, or selected manually by a server administrator.

Similarly, the whitelist 144 may be created and maintained by a proxy service, for example, proxy service 116e in FIG. 5. The proxy service may store the whitelist in a datastore (136 or 1010 in FIG. 5). The proxy service may add source identifiers to the whitelist that it has determined correspond to sources that provide injected scripts that are not harmful or demanding in terms of the requests they generate to the server. Whitelist identifiers may be provided by an external third party. A proxy service may subscribe to a third-party source for periodic updates to the blacklist and or the whitelist. Both the blacklist and whitelist may be updated by an operator of the server system.

Above we described using source identifiers, and more specifically URLs, to identify scripts. In some embodiments, request header information can be used to help identify and/or monitor an injected script. Header fields are components of the header section of request and response messages in the Hypertext Transfer Protocol (HTTP). The header fields are transmitted after the request or response line, which is the first line of a message. In HTTP, header fields are colon-separated name-value pairs in clear-text string format, terminated by a carriage return (CR) and line feed (LF) character sequence. There are many standard request header fields used to set various parameters.

"User-Agent" is one standard request header field—a short string that web browsers and other applications may send to identify themselves to web servers. Typically, it may comprise a line of text that identifies the browser and operating system ("OS") to the web server. A User-Agent pair might look like this example: "User-Agent: Mozilla/5.0 (X11; Linux x86_64; rv:12.0) Gecko/20100101 Firefox/21.0." In HTTP, the User-Agent string is often used for content negotiation, where the origin server selects suitable content or operating parameters for the response. For example, the User-Agent string might be used by a web server to choose variants based on the known capabilities of a particular version of client software. There may be a default User-Agent header for a particular browser.

In some cases, a requesting script may provide its own User-Agent string for inclusion in request headers, or it may modify one or more other header fields. In some embodiments, request header information, including the User-Agent field and/or any combination of header fields may be used to help identify the script generating the request. For example, the server or proxy server may capture the values of one or more header fields of a received request as a kind of "fingerprint" for identification of the entity generating the request. This fingerprint data may be stored on the server side as an identifier of a script, for example, in a blacklist or a whitelist. The proxy server may maintain and update header fingerprints in blacklists and or whitelists, and use them in much the same way as the URL lists described above.

On the client side, in some embodiments, the header of an outgoing request, or part of it (selected fields) may be captured in a protective script running on the client side browser. The protective script may be configured to store that data as a "fingerprint" for identification of the script that generated the request, and optionally transmit the fingerprint to the server side for analysis, and/or use in updating a whitelist or a blacklist. More generally, header data can be used along with any other metadata about a script to determine whether to take a protection action, and optionally what action to take. Another example such metadata is a request frequency—the frequency of server requests generated by a script. This parameter is described in more detail below with reference to FIG. 4B.

FIG. 4B is a simplified flow diagram illustrating one example of a monitoring process executing in a protective script in accordance with some embodiments. This process may be executed without regard to detection of injection of any particular script or other code. Regardless of the source of the script, a process may be used to monitor for excessive requests being made to the server. Moreover, in a case that requests are being generated by some method that does not include a <script> tag on the page, or otherwise evades detection, this process may still be effective to mitigate impact on the server side. To begin, the protective script detects a request being issued to the server, block 450. It may be detected by an event as described above. Responsive to detecting a request, the protective script increments a counter (or initializes a counter in the first instance), block 452, so that it counts the events. The protective script gets a timer value, not necessarily in this exact sequence, block 454. In other embodiments, the process need not acquire a timer value after every request instance. For example, it may carry out the steps shown only after 5 or 50 or some other threshold number of requests. In another example, the process may check the request count periodically, say every 50 or 300 msec.

In the example illustrated, the process gets the timer value 454, and uses the current request count and the elapsed timer value to calculate a frequency of requests; for example, 10 requests over 100 msec=100 requests per second—a frequency certainly not being caused manually by a human user. The frequency of requests may be compared to a predetermined limit, decision 460. The limit may be fixed in the protective script. In an alternative, it may be updated by a message from the server side. In cases where the server side is under heavy loading, for example, it may notify executing protective scripts asynchronously to lower the request frequency limit. If the frequency is below the limit, the process continues via path 462 back to watching for a next request at block 450. If the request frequency exceeds the limit, the process takes one or more of the countermeasures described above, block 464. Then the protective script resets the timer and the request counter, block 466, and loops via path 470 back to block 450.

Referring now to FIG. 5, another example of an environment 1000 in which embodiments of this disclosure may be used is illustrated. A client-side device 1002 as described above has access to a network 1004. The client-side device 1002 may correspond to client devices 104 or 120 in FIG. 1. A frontend VIP (virtual IP address system) 1006 is coupled to the network 1004. A virtual IP address (VIP) is an IP address that does not correspond to an actual physical network interface (port). Uses for VIPs include Network Address Translation (especially, One-to-many NAT), fault-tolerance, and some kinds of security. A proxy fleet 1008 comprises one or more servers configured to implement a set of services that proxy requests from the frontend VIP 1006 to back-end services, for example, a web site, and various web applications, which may be implemented on one or more backend servers 112. The backend servers 112 and the proxy fleet 108 have access to a datastore 1010 further described below.

The proxy fleet 108 performs a variety of functions, some of which are to protect services. Examples of proxy services 1009, indicated individually as 116a-116e, may include insulating back-end web applications from slow clients, redirecting legacy URLs (to preserve SEO during platform migration), mapping external URLs to internal URLs, correcting mistyped domain names, redirecting short URLs, high-volume traffic analysis and load shedding, blacklist page requests based on IP/Subnet, Global Request ID (RID) generation, encrypt of sensitive data (e.g., payment instrument data), etc.

One primary purpose of the proxy fleet 108 is to consolidate much of the website request routing functionality in a centralized location of the website request pipeline. As such, it is a system that is highly available, fault-tolerant, scalable and easy to manage. In use, a customer may actually utilize multiple different proxy servers 1008 and multiple different proxy services 1009 over the course of their "session". For example, an initial request may go to service 116a and a subsequent request may go to 116b, although these actions may not be apparent to the client.

Referring again to FIG. 5, as will be appreciated, although a web-based environment is used for purposes of explanation, different environments may be used, as appropriate, to implement various embodiments. The electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network 1004 can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof.

The illustrative environment includes at least one proxy server, a backend server, and a data store 1010. It should be understood that there can be several application servers, layers or other elements, processes or components, which may be chained or otherwise configured, which can interact to perform tasks such as obtaining data from an appropriate data store. Servers, as used herein, including the VIP, proxy fleet, and back-end services servers, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The backend services server 112 may include any appropriate hardware, software and firmware for integrating with the data store as needed to execute aspects of one or more applications, handling some or all of the data access and business logic for some applications and or back-end services. The backend services server 112 may provide access control services in cooperation with the data store and is able to generate content including, but not limited to, text, graphics, audio, video and/or other content usable to be provided to the user, which may be served to the user by the online proxy fleet in the form of HyperText Markup Language ("HTML"), Extensible Markup Language ("XML"), JavaScript, Cascading Style Sheets ("CSS") or another appropriate client-side structured language. The online proxy fleet 108 may implement some or all of the functionality of the proxy server 116 of FIG. 1. A proxy service 116c, in some embodiments, may implement the functionality of the protective script service 134 of FIG. 1, including without limitation the creation and management of protective scripts. The handling of all requests and responses, as well as the delivery of content between the client device 1002 and the backend services 112, may be handled by the frontend VIP in conjunction with the online proxy fleet 108 using, for example, PHP: Hypertext Preprocessor ("PHP"), Python, Ruby, Perl, Java, HTML, XML or another appropriate server-side structured language in this example. It should be understood that the various servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 may include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The datastore 1010 may implement the datastore 136 of FIG. 1, including storage of a blacklist and a whitelist of script source locations. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a webpage that the user is able to view via a browser on the user device 1002. Information for a particular item of interest can be viewed in a dedicated page or window of the browser. It should be noted, however, that embodiments of the present disclosure are not necessarily limited to the context of webpages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 1000 in FIG. 5 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims. The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

The invention claimed is:

1. A system for mitigating loading on a server system caused by client-side executable scripts, the system comprising:

a server computing system comprising one or more hardware processors, the server computing system further including memory storing computer-executable instructions that, as a result of execution on the one or more hardware processors, cause the processors to generate hypertext markup language ("HTML") network pages; and a proxy server computing system in communication with the server computing system, the proxy server computing system comprising one or more hardware processors and further including memory storing computer-executable instructions that, as a result of execution on the one or more hardware processors, cause the processors to:

responsive to receiving, over a communications network, a hypertext transfer protocol request for an HTML network page referenced by a uniform resource locator ("URL") from a remote device executing a browser, transmit a request to the server computing system to generate the HTML network page;

receive the HTML network page from the server computing system;

determine whether to embed a protective script into the HTML network page to form a modified HTML network page; and responsive to determining to embed the protective script, generate the modified HTML network page by embedding the protective script into the received HTML network page and send the modified HTML network page to the remote device in reply to the request;

wherein the protective script includes code executable by the browser of the remote device and configured to:

detect an event exposed by a rendering engine or by a virtual machine that indicates introduction of a new HTML element on the modified network page; and responsive to detecting the event;

in the case that the new HTML element comprises a new script:

ascertain a source location of the new script;

compare the source location to at least one list of source locations;

determine whether to take a protective action based on the comparison; and as a result of determining to take a protective action, execute a protective action;

wherein the protective action comprises any one or more of (a) blocking the new script from loading on the modified HTML network page, (b) modifying the new script so as to reduce a frequency of requests generated by the new script, (c) deleting the new script, or (d) reloading the modified HTML network page from the proxy server computing system so that the new script is omitted.

2. The system of claim 1, wherein the protective script includes code executable by the browser of the remote device and configured to:

determine if white-listing-only is required;

in the case that white-listing-only is required, determine whether the source location is on a whitelist provided in the protective script, and if it is determined that the source location is not on the whitelist, take the protective action; and in the case that white-listing-only is not required, determine whether the source location is on a blacklist provided in the protective script, and if it is determined that the source location is on the blacklist, take the protective action.

3. The system of claim 1, wherein the protective script includes code executable by the browser and configured to:

receive a notification event indicating a call to load external code into the modified HTML network page;

responsive to the notification event, ascertain a source location of the external code;

compare the source location of the external code to the at least one list of source locations; and determine whether to take a protective action based on the comparison of the source location of the external code to the at least one list of source locations.

4. The system of claim 1, wherein the protective script includes code configured to:

permit the new script to execute in the browser;

monitor a frequency of server requests generated by the new script; and if the frequency of requests exceeds a predetermined limit, take a protective action.

5. The system of claim 3, wherein the protective script includes code configured to identify a URL in the notification event as a location from which the script is requested, and block the external code if the identified URL is on a blacklist provided by the proxy server.

6. The system of claim 1, wherein the proxy server is configured to determine whether to modify the HTML network page by accessing recent request data; and modify the HTML network page in response to the recent request data indicating excessive recent requests for the HTML network page.

7. The system of claim 1, wherein the proxy server is configured to dynamically update the at least one list of source locations.

8. The system of claim 1, wherein the proxy server randomly selects the protective action to be taken as one or more of (a) blocking the new script from loading on the modified HTML network page, (b) modifying the new script to slow its operation, (c) deleting the new script, or (d) reloading the HTML network page as it was received from the server computing system.

9. A method for execution in a web browser running on a device, the method comprising:
receiving a network page downloaded over a network, the network page including an embedded protective script;
in a web browser, rendering the received network page and executing the protective script, wherein executing the protective script includes:
receiving an indication of a new element added to the network page;
responsive to the indication, determining whether the new element is a script;
in the case that the new element is a script, extracting a source identifier for the script;
comparing the source identifier to at least one list of script source identifiers;
based on the comparison, determining whether to take a protective action; and
in the case that a protective action is determined to be taken, executing the protective action in the web browser.

10. The method of claim 9, wherein the protective action comprises one or more of (a) deleting the new script from the current network page, (b) modifying the new script to slow its operation, (c) permitting the new script to operate and monitoring a server request frequency, (d) reloading the current network page, or (e) allowing the script to run and blocking requests generated by the script.

11. The method of claim 9, wherein the determining whether to take action includes:
responsive to a determination that white-listing is required and a determination that the source identifier is not on the whitelist, taking the protective action.

12. The method of claim 9, wherein determining whether to take action includes comparing the source identifier to a blacklist of prohibited source identifiers, and if the source identifier is on the blacklist, taking the protective action.

13. The method of claim 9, wherein:
the received network page comprises an hypertext markup language ("HTML") network page;
the browser creates a Document Object Model ("DOM") when loading the HTML network page; and
the indication of a new element comprises an alert responsive to a change in the DOM.

14. The method of claim 9, and wherein executing the protective script includes, in the case that a protective action was taken, sending a message reporting the protective action to a proxy server that sourced the received network page.

15. The method of claim 9, and wherein executing the protective script includes, in the case that a protective action was taken, rendering content to display a message in the web browser indicating that the protective action was taken.

16. A non-transitive, tangible media storing a machine-readable script for inclusion in a network page before the network page is downloaded to a client device, the script including instructions for execution in a browser that renders the network page on the client device, and the instructions configured to, as a result of execution, cause the browser to:
detect an attempt to add a new element to a network page;
responsive to the attempt, determine whether the new element is a script;
in the case that the new element is a script, extract a source identifier for the script;
compare the source identifier to at least one list of script source identifiers;
based on the comparison, determine whether to take a protective action; and
in the case that a protective action is determined to be taken, execute the protective action in the browser;
wherein the protective action comprises one or more of (a) preventing injection of the script, (b) allowing injection of the script and then modifying the injected script; (c) deleting the script, or (d) requesting a reload of the network page from the server.

17. The media of claim 16, wherein the instructions are configured to receive an Asynchronous JavaScript and XML ("AJAX") notification event to detect the attempt to add the new element to the network page.

18. The media of claim 16, wherein the instructions are configured to detect a change to a Document Object Model ("DOM") created by the browser when loading the network page to detect the attempt to add the new element to the network page.

19. The media of claim 16, wherein the instructions are configured to:
identify a uniform resource locator ("URL") from the source identifier indicating a location from which the new element is requested; and
select at least one of the protective actions based on comparing the identified URL to at least one list of URLs.

20. The media of claim 16, wherein the instructions are configured to send a message to a proxy server that sourced the network page reporting what protective action(s) were taken.

* * * * *